Nov. 4, 1969   J. J. CALLAHAN   3,476,214
DIVISIONAL LUBRICANT FEEDER WITH BYPASS MEANS
Filed Feb. 1, 1968   2 Sheets-Sheet 1
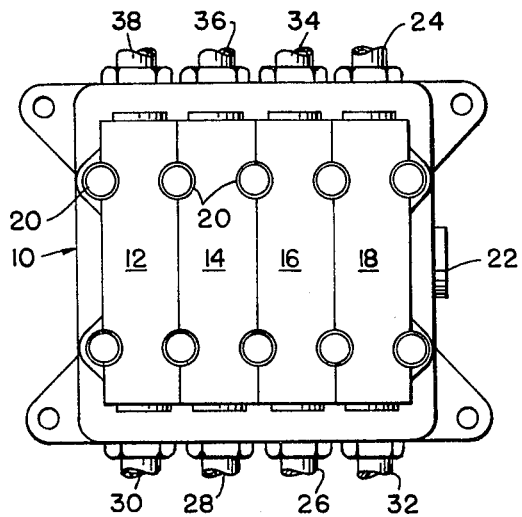
FIG.1
FIG.2
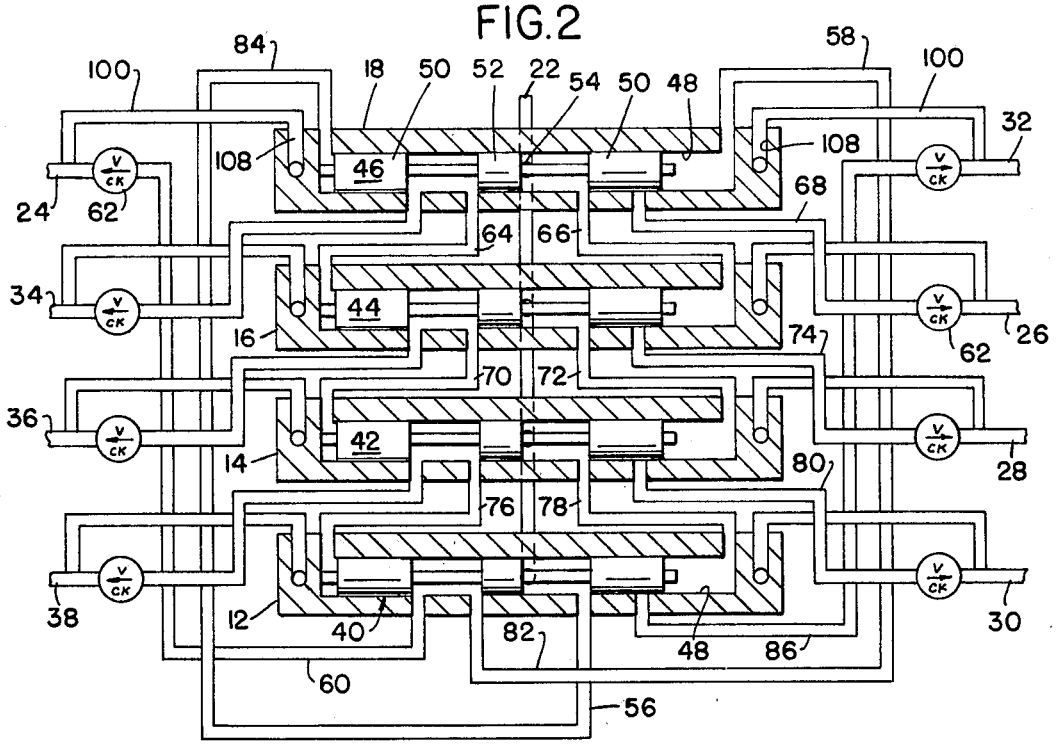
INVENTOR
JAMES J. CALLAHAN
BY Whittemore, Hulbert
& Belknap
ATTORNEYS Nov. 4, 1969    J. J. CALLAHAN    3,476,214
DIVISIONAL LUBRICANT FEEDER WITH BYPASS MEANS
Filed Feb. 1, 1968    2 Sheets-Sheet 2
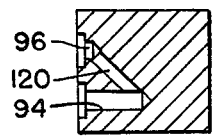
FIG.4
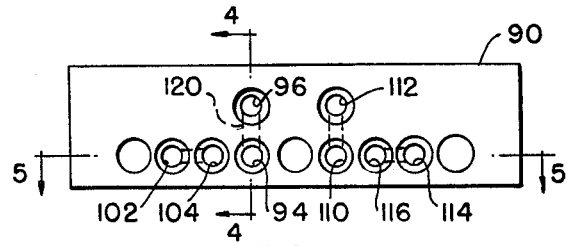
FIG.3
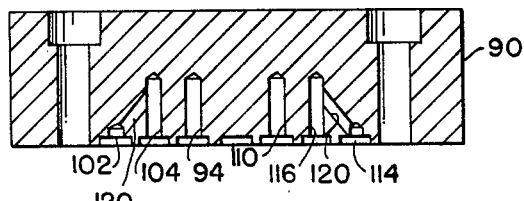
FIG.5
FIG.6
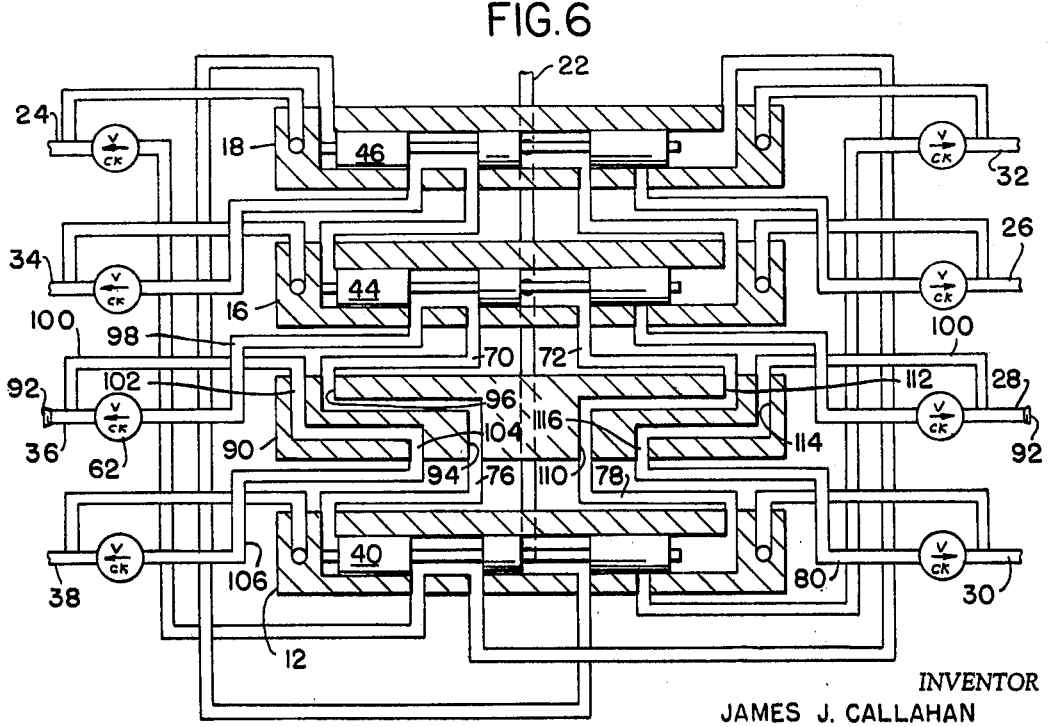
INVENTOR
JAMES J. CALLAHAN
BY Whittemore, Hulbert
& Belknap
ATTORNEYS

United States Patent Office 3,476,214
Patented Nov. 4, 1969

3,476,214
DIVISIONAL LUBRICANT FEEDER WITH
BYPASS MEANS
James J. Callahan, Mentor, Ohio, assignor to McCord
Corporation, Detroit, Mich., a corporation of Maine
Filed Feb. 1, 1968, Ser. No. 702,392
Int. Cl. F16n 13/22, 25/02
U.S. Cl. 184—7         5 Claims

ABSTRACT OF THE DISCLOSURE

A divisional lubricant feeder of the type comprising a series of valve blocks individually mounted on a base which has therein an inlet manifold supplied with lubricant under pressure, the outlets for the valve blocks, and a system of passages interconnecting the valve blocks for automatic sequential operation. A bypass block is interchangeable with any of the valve blocks, as long as there remains at least three working valve blocks, and has passages therein communicating with the passages in the base to reroute certain passages in the system of passages to maintain the normal cyclical order of operation of the remaining working valve blocks. The by-pass block may be used to replace a valve block to eliminate unneeded discharge outlets and conversely a bypass block may be replaced by a working valve block to add additional lubricant outlets to the system.

---

In Porter and Urso U.S. Patent No. 3,298,460 there is disclosed a divisional lubricant feeder of the type to which this invention is directed. Such a system comprises a series of individual metering valve blocks mounted on a base which contains the passage system which interconnects the valve blocks for automatic sequential operation when lubricant under pressure is supplied to the inlet manifold in the base. The outlet terminals for the individual valve blocks are also in the base, thus enabling removal of the valve blocks without disrupting the connections to the pump which supplies lubricant under pressure or the connections to the bearings or other points to be lubricated. In a lubricant feeder of the type shown in the above-mentioned patent the base is designed for a specific number of working valves, of which there must be at least three. The present invention provides one or more bypass blocks for use in a device of this type which may replace any of the working valve blocks as long as three working valve blocks remain in the system and which contain passages communicating with the system of passages in the base in such a way as to maintain the normal cyclical operation of the remaining working valve blocks in the system. Through this expedient a divisional lubricant feeder having a number of working valve blocks and one or more bypass blocks may be provided. The bypass blocks eliminate a predetermined number of unused lubricant outlets in the system. As additional outlets are needed the bypass blocks may be replaced by working valve blocks, or a working valve block may be replaced by a bypass block to eliminate outlets from the system which are no longer needed.

In the drawings:
FIGURE 1 is a plan view of a divisional lubricant feeder embodying the present invention;
FIGURE 2 is a schematic view illustrating the passage system which interconnects four valve blocks for automatic sequential operation;
FIGURE 3 is a bottom plan view of a bypass block which may replace any one of the working valve blocks in the system;
FIGURE 4 is a sectional view taken on line 4—4 of FIGURE 3;
FIGURE 5 is a sectional view taken on line 5—5 of FIGURE 3; and
FIGURE 6 is a schematic view similar to FIGURE 2 with a bypass block replacing one of the valve blocks.

A divisional lubricant feeder comprises a base 10 having a series of valve blocks 12, 14, 16 and 18 individually mounted thereon by bolts 20 so that the valve blocks may be individually removed and replaced as desired. The base 10 has an an inlet terminal 22 adapted to be supplied with lubricant under pressure from a pump (not shown) or other source of lubricant. The base is also provided with outlet terminals 24, 26, 28, 30, 32, 34, 36 and 38 through which metered quantities of lubricant are discharged to the points to be lubricated. The base 10 is also provided with a system of passages illustrated schematically in FIGURES 2 and 6 which together with porting passages in the valve blocks 12, 14, 16 and 18 interconnect the valve blocks for automatic sequential operation as long as lubricant is supplied through the inlet 22. Reference may be had to U.S. Patent No. 3,298,460 for further details of construction of the base 10 and the system of passages therein.

Referring to FIGURE 2, the valve blocks 12, 14, 16 and 18 are identical in construction and include pistons 40, 42, 44 and 46 reciprocable within bores 48. Each of the pistons has end lobes 50 and a center lobe 52. The valve blocks also include a series of porting passages opening from the lower surface thereof which communicate with the system of passages contained within the base 10. The base includes an inlet manifold communicating with the inlet terminal 22 and each valve bore 48 communicates with the inlet manifold through a passage 54.

In the schematic illustration of FIGURE 2 the piston 40 in the valve block 12 has just shifted to the left, thereby opening communication from the inlet manifold in the base into the valve bore on the right-hand side of the center lobe 52 of the piston 40 and to the passage 56 in the base which leads to the left-hand end of the bore 48 of valve block. The lubricant under pressure will shift the piston 46 to the right, thereby discharging lubricant from the right-hand end of its valve bore through the passage 58 and through one of the porting passages in the valve block 12 into the valve bore of the block 12 between the center and left-hand lobes of the piston 40 and through passage 60 in the base to the outlet terminal 24 past a check valve 62 therein.

As soon as piston 46 completes its movement to the right-hand end of its valve bore, the lubricant under pressure from the inlet manifold will be communicated through the passage 64 with the left-hand end of the valve bore in block 16 to shift the piston 44 to the right, discharging lubricant from the right-hand end of the valve bore of block 16 through passage 66 between the two right-hand lobes of piston 46 in valve block 18 and through passage 68 to outlet terminal 26. All of the outlet terminals are provided with a check valve 62.

Movement of the piston 44 in block 16 to the right will communicate passage 70 with the inlet manifold to supply lubricant under pressure to the left-hand end of the bore in valve block 14 thereby shifting the piston 42 to the right to discharge lubricant from the right-hand end thereof through passage 72 into the bore in valve block 16 between the lobes of the piston therein and through passage 74 to outlet terminal 28.

Movement of the piston in valve block 14 to the right will supply lubricant under pressure through passage 76 to the left-hand end of the bore in valve block 12 to shift the piston 40 to the right thereby discharging lubricant through passage 78 into the bore of block 14 between the lobes of the piston therein and through passage 80 to outlet terminal 30. When the piston 40 has completed its movement to the right, lubricant under pressure will be supplied from the bore in valve block 12 to passage 82 which leads to passage 58 communicating with the right-hand end of the bore in valve block 18, thereby shifting the piston therein to the left to discharge lubricant from the left-hand end of the bore in block 18 through passage 84 and passage 56 into the bore of valve block 12 between the lobes of piston 40 and through passage 86 to outlet terminal 32.

The device will continue cycling in the manner described as long as lubricant under pressure is supplied through the inlet terminal 22, lubricant being discharged in sequence through outlet terminals 34, 36 and 38.

The bypass block 90 shown in FIGURES 3, 4, 5 and 6 is of the same size and shape as the valve blocks 12, 14, 16 and 18 and may replace any one of such valve blocks. In FIGURE 6 the bypass block 90 is shown as replacing the valve block 14. The bypass block 90 contains a series of passages therein by means of which the outlet terminals for the valve block which the bypass block replaces may be eliminated from the system. Since the bypass block 90 replaces the valve block 14 in FIGURE 6, the outlet terminals 36 and 28 are closed by suitable plugs 92.

Referring to FIGURE 6, when the piston 40 of valve block 12 shifts to the left, lubricant is discharged therefrom through passage 76 in the base into a porting passage 94 in the bypass block 90 which communicates through the bypass block with a porting passage 96 leading to the passage 70 which communicates with the bore in valve block 16. The lubricant discharged from the left-hand end of valve block 12 will thus be valved through the block 16 between the lobes of the piston therein and discharged through passage 98 past the check valve 62 therein and through an alternate outlet passage 100 in the base which leads to a porting passage 102 in the bypass block 90 which in turn communicates through the bypass block with a porting passage 104 in the bypass block which communicates with a passage 106 in the base leading to outlet terminal 38.

Referring to FIGURES 2 and 6, it will be noted that an alternate outlet passage 100 leads from each of the passages in the base connected to an outlet terminal on the downstream side of the check valve 62 therein. Such alternate outlet passages 100 communicate with a porting passage 108 in the appropriate valve block. The passages 108 in the valve block may be plugged when they are not to be used or one or more of such passages may be opened to permit discharge of lubricant therefrom to perform an indicating function or the like. The alternate outlet passage system described is ordinarily not used to supply lubricant to a bearing but is available in the event that it is desired to discharge lubricant through an outlet in a valve block rather than through the normal outlet terminal in the base for such valve block. The bypass block of the present invention utilizes the existing alternate outlet passages in the base to reroute the lubricant flow through the system of passages so that each working valve block discharges lubricant at each end of its stroke through the normal lubricant outlet that such valve block utilizes when the system includes all working valve blocks.

The bypass block 90 has additional porting passages 110 and 112 in communication with each other interiorly of the bypass block and communicating respectively with passages 78 and 72 in the base 10. Porting passages 114 and 116 respectively communicate with the alternate outlet passage 100 for valve block 14 and passage 80 which leads to outlet terminal 30.

FIGURES 3, 4 and 5 illustrate the porting passages in the bypass block as actually constructed. Such passages may consist simply of drilled holes of appropriate depth interconnected by angular drilled passages 120 to interconnect the appropriate porting passages. Any number of bypass blocks 90 may be incorporated at any place in the series of blocks mounted on a base 10 as long as three working valve blocks remain in the system. The bypass blocks thus permit the use of as few as six outlet terminals up to the maximum number possible with a metering device of the type described without requiring any change in the base except for the necessity to plug the unused outlets and without requiring any disruption of the connections to the pump or the points to be lubricated.

What I claim as my invention is:

1. In a divisional lubricant feeder assembly comprising a series of interrelated sequential divider valves, a base on which said valves are mounted and having therein an inlet manifold connected to said valves for supplying lubricant under pressure thereto, individual outlets for each of said valves and a system of fluid passages interconnecting said valves for automatic sequential and cyclical discharge of lubricant therefrom through said outlets in response to the continuous supply of lubricant under pressure through said inlet manifold, each of said valves comprising a valve block individually mounted on said base, porting passages in said base and valve blocks and extending through the faying faces between said base and each of said valve blocks, said porting passages interconnecting said valves with said manifold and said outlets and said system of passages in said base, said assembly comprising at least three of said valve blocks and said base being adapted to accommodate a greater number of said valve blocks, and a bypass block mounted on a portion of said base which could accommodate an additional valve block and having porting passages therein communicating with the corresponding porting passages in said base whereby lubricant discharged from one valve block into said system of passages is routed through said bypass block back into said system of passages to be discharged through the outlet for said one valve block, and removable means individually securing each of said blocks to said base.

2. An assembly according to claim 1 wherein said bypass block is interchangeable with any of said valve blocks.

3. An assembly according to claim 2 wherein the outlets corresponding to said portion of said base are plugged to eliminate unneeded outlets from the assembly.

4. In a divisional lubricant feeder assembly comprising a series of interrelated sequential divider valves, a base on which said valves are mounted and having therein an inlet manifold connected to said valves for supplying lubricant under pressure thereto, individual outlets for each of said valves and a system of fluid passages interconnecting said valves for automatic sequential and cyclical discharge of lubricant therefrom through said outlets in response to the continuous supply of lubricant under pressure through said inlet manifold, each of said valves comprising a valve block individually mounted on said base, porting passages in said base and valve blocks and extending through the faying faces between said base and each of said valve blocks, said porting passages interconnecting said valves with said manifold and said outlets and said system of passages in said base, each of said valve blocks having a bore and a reciprocable piston therein adapted to discharge lubricant therefrom upon movement in either direction through said system of passages into the bore of the preceding valve in the series past a valving portion of the piston therein and back into said system of passages to the outlet for such valve block, and a bypass block interchangeable with and adapted to replace any one of said valve blocks, said bypass block having porting passages therein communicating with the corresponding porting passages in said base for the replaced valve block whereby lubricant discharged from one valve block is routed through said bypass block into said system of passages and into the bore of the preceding valve block in the series past said valving portion and then through said bypass block back into said system of passages to the outlet for said one valve block.

5. An assembly according to claim 4 wherein the outlets for the replaced valve block are plugged.

References Cited

UNITED STATES PATENTS

| | | | |
|---|---|---|---|
| 2,792,911 | 5/1957 | Harter | 184—7 |
| 3,216,443 | 11/1965 | Schmiel | 137—596.13 XR |
| 3,219,146 | 11/1965 | Leese et al. | 184—71 |
| 3,298,460 | 1/1967 | Porter et al. | 184—7 |
| 3,414,085 | 12/1968 | Fujita | 184—7 |

FOREIGN PATENTS 1,197,701  7/1965  Germany.

FRED C. MATTERN, JR., Primary Examiner

M. ANTONAKAS, Assistant Examiner

U.S. Cl. X.R.

137—271